US010587536B1

(12) United States Patent
Kwan et al.

(10) Patent No.: US 10,587,536 B1
(45) Date of Patent: Mar. 10, 2020

(54) BUFFER ASSIGNMENT BALANCING IN A NETWORK DEVICE

(71) Applicant: Innovium, Inc., San Jose, CA (US)

(72) Inventors: Bruce Hui Kwan, Sunnyvale, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 15/996,378

(22) Filed: Jun. 1, 2018

(51) Int. Cl.
*H04L 12/883* (2013.01)
*H04L 12/823* (2013.01)
*H04L 12/879* (2013.01)
*H04L 12/815* (2013.01)

(52) U.S. Cl.
CPC ........ *H04L 49/9021* (2013.01); *H04L 47/326* (2013.01); *H04L 49/9026* (2013.01); *H04L 47/22* (2013.01)

(58) Field of Classification Search
None
See application file for complete search history.

(56) References Cited

U.S. PATENT DOCUMENTS

| | | | | |
|---|---|---|---|---|
| 7,508,763 | B2* | 3/2009 | Lee | H04L 47/10 370/231 |
| 8,565,249 | B2* | 10/2013 | Isaksson | H04L 47/10 370/412 |
| 2003/0223442 | A1* | 12/2003 | Huang | H04L 47/10 370/412 |
| 2006/0187826 | A1* | 8/2006 | Chuang | H04L 47/22 370/229 |
| 2016/0173383 | A1* | 6/2016 | Liu | H04L 47/30 370/235 |
| 2017/0048144 | A1* | 2/2017 | Liu | H04L 47/122 370/235 |

* cited by examiner

*Primary Examiner* — Anh Vu H Ly
(74) *Attorney, Agent, or Firm* — Wong & Rees LLP; Karl T. Rees

(57) ABSTRACT

Techniques for improved handling of queues of data units are described, such as queues of buffered data units of differing types and/or sources within a switch or other network device. When the size of a queue surpasses the state entry threshold for a certain state, the queue is said to be in the certain state. While in the certain state, data units assigned to the queue may be handled differently in some respect, such as being marked or being dropped without further processing. The queue remains in this certain state until its size falls below the state release threshold for the state. The state release threshold is adjusted over time in, for example, a random or pseudo-random manner. Among other aspects, in some embodiments, this adjustment of the state release threshold addresses fairness issues that may arise with respect to the treatment of different types or sources of data units.

22 Claims, 10 Drawing Sheets

BUFFER ASSIGNMENT BALANCING IN A NETWORK DEVICE

TECHNICAL FIELD

Embodiments relate generally to data queueing, and, more specifically, to techniques for handling queued data units within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing devices, including, without limitation, switches, routers, and other network devices, often temporarily store data in one or more memories or other storage media. For instance, network devices often buffer significant numbers of data units, such as packets, frames, or cells, until certain events occur and/or until resources become available to process the data units. The storage media in which such data is temporarily stored is often logically and/or physically divided into discrete regions or sections referred to as data buffers (or, simply, "buffers").

In some computing devices, mechanisms referred to as queues are utilized to determine the orders in which this buffered data is processed. For instance, a first-in-first-out ("FIFO") queue may be implemented, whereby buffered data units are processed in the order by which they are added to the queue. The queue comprises a series of linked nodes, including a tail node, any number of intermediate nodes, and a head node. Each node corresponds to a different buffered unit of data. Each newly buffered data unit is added to the end, or tail, of the queue, immediately following the data unit previously at the tail of the queue. The "head" of the queue generally corresponds to the oldest item in the queue. When it is time to process a next data unit, the data unit at the head of the queue is removed (also referred to as being "popped" or "released") from the queue for processing, and the immediately following data unit becomes the head of the queue. As a result of this processing, certain actions may be taken that result in the released data unit being finally processed or otherwise disposed of, and thus no longer buffered.

In some computing devices, there may be multiple queues. These multiple queues may be utilized for different groups of data units, such as different types of data units, or data units associated with different entities. Different queues may exist for different processing components, which may process data units from their respective queues in parallel and/or in series relative to the other processing components. In some embodiments, certain data units may, upon being processed by one processing component, be added to a different queue to await processing by a different component, rather than being removed from its buffer.

Some computing devices may be configured to behave differently depending on the size of a queue. For example, a computing device may enter different states based on the queue size. One such state may be, for example, a discard state in a network device, whereby certain network packets or other data units are discarded rather than buffered, until the size of the corresponding queue falls below a certain threshold. Among other purposes, such a state may be necessary when the queue grows too long, so as to prevent associated data buffers from being overrun, or to meet certain performance guarantees. A variety of other states may be tied to the size of a queue, each having different effects on the behavior of the computing device.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
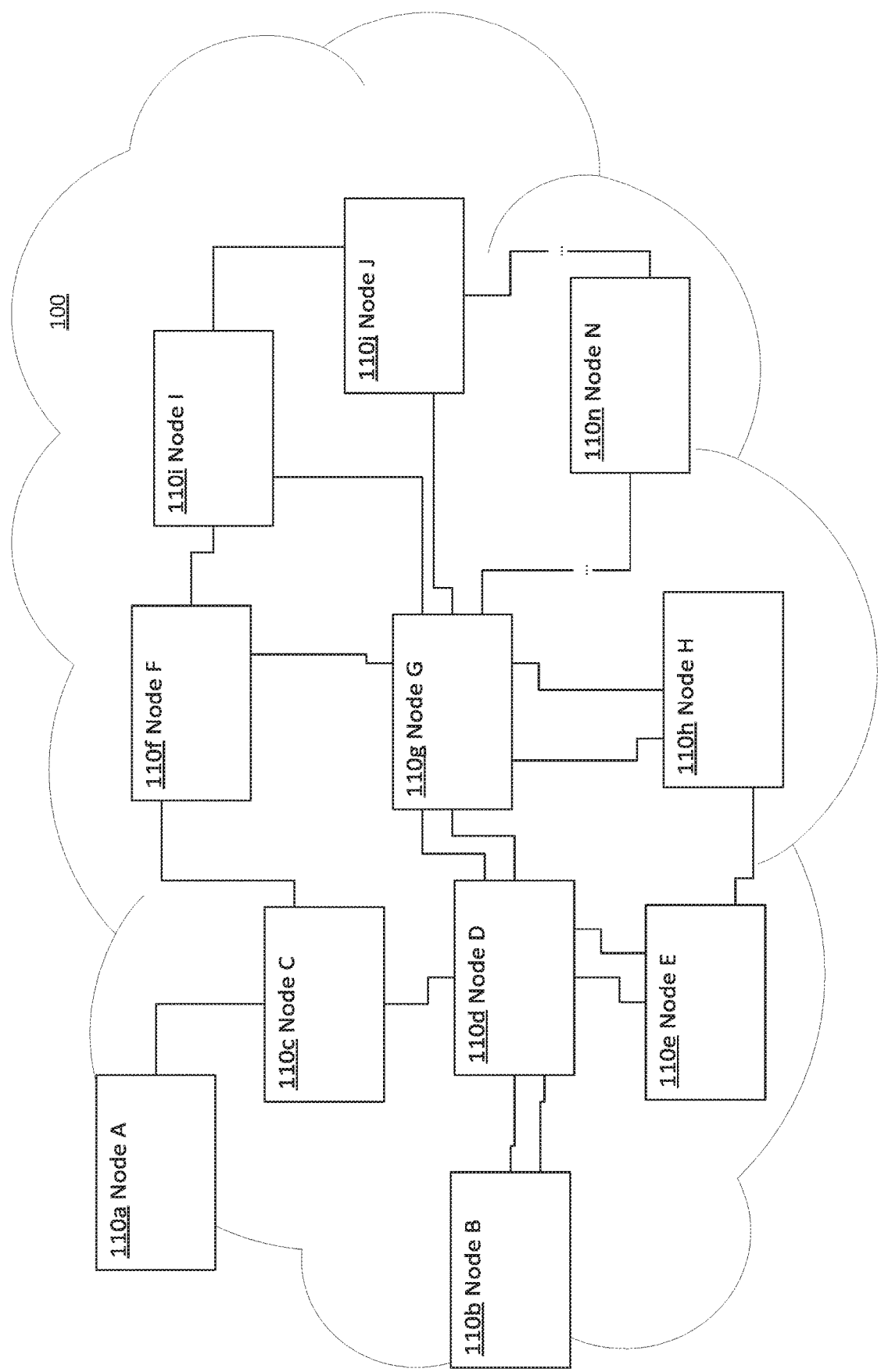
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
    2.0. Structural Overview
    2.1. Data Units
    2.2. Data Unit Processors
    2.3. Processing Queues
    2.4. Queue Assignment
    2.5. Queue Admission Controller
    2.6. Accounting Mechanism
    2.7. Queue State Controller
    2.8. Release Point Adjustor
    2.9. Miscellaneous
    3.0. Functional Overview
    3.1. Enqueuing Data Units
    3.2. Dequeuing Data Units
    3.3. Updating Queue State
    3.4. Adjusting Queue Release Point
    3.5. Reserve-Limit Based Calculation of Release Point 4.0. Implementation Example
5.0. Example Embodiments
6.0. Example Implementing System
6.1. Network Packets
6.2. Network Paths
6.3. Network Device
6.4. Ports
6.5. Packet Processors
6.6. Buffers
6.7. Queues
6.8. Traffic Management
6.9. Miscellaneous
7.0. Implementation Mechanism—Hardware Overview
8.0. Extensions and Alternatives 1.0. GENERAL OVERVIEW Approaches, techniques, and mechanisms are disclosed for improved handling of queues of data units in various contexts, including, without limitation, queues of buffered data units of differing types and/or sources within a switch or other network device. A measure of the size of a queue is tracked over time, as data units enter and leave the queue. Based on this measure, queue state information is updated periodically or at other intervals. The queue state information is updated by comparing the size to various thresholds, including a state entry threshold and a state release threshold. When the size surpasses the state entry threshold for a certain state, the queue is said to be in the certain state. While in the certain state, data units assigned to the queue may be handled differently in some respect, such as being marked or being dropped without further processing. The queue remains in this certain state until its size falls below the state release threshold for the state. The state release threshold is adjusted over time in, for example, a random or pseudo-random manner.

In some embodiments, data units of different types or from different sources are queued within the same queue. Among other aspects, in such embodiments, adjusting the state release threshold addresses fairness issues with respect to these different types, sources, or other distinct groupings. For example, in conventional devices, various patterns may manifest themselves, whereby data units from certain sources or of certain types are disproportionately more likely to be assigned to a queue while the queue is in a certain state. Consequently, an action associated with the certain state, such as discarding the data unit or marking the data unit, may disproportionately be applied to data units from the source or of the type, in an unfair manner. Varying the state release threshold over time may reduce such issues.

For instance, traffic patterns in a network device may cause a queue of data units to oscillate in and out of a discard state at regular intervals. These intervals may roughly correspond to the intervals at which data units from certain source ports arrive at the queue. Data units from one source port may therefore tend to arrive while the queue is in the discard state, and thus tend to be discarded, whereas data units from another source port may not. By varying the state release threshold, jitter may be introduced into the durations of time that the queue remains in the associated state, thereby guarding against such periodic patterns, and increasing the fairness with which traffic is treated across multiple source ports.

In other aspects, the inventive subject matter encompasses computer apparatuses and/or computer-readable media configured to carry out the foregoing techniques.

2.0. STRUCTURAL OVERVIEW

Figure 3:
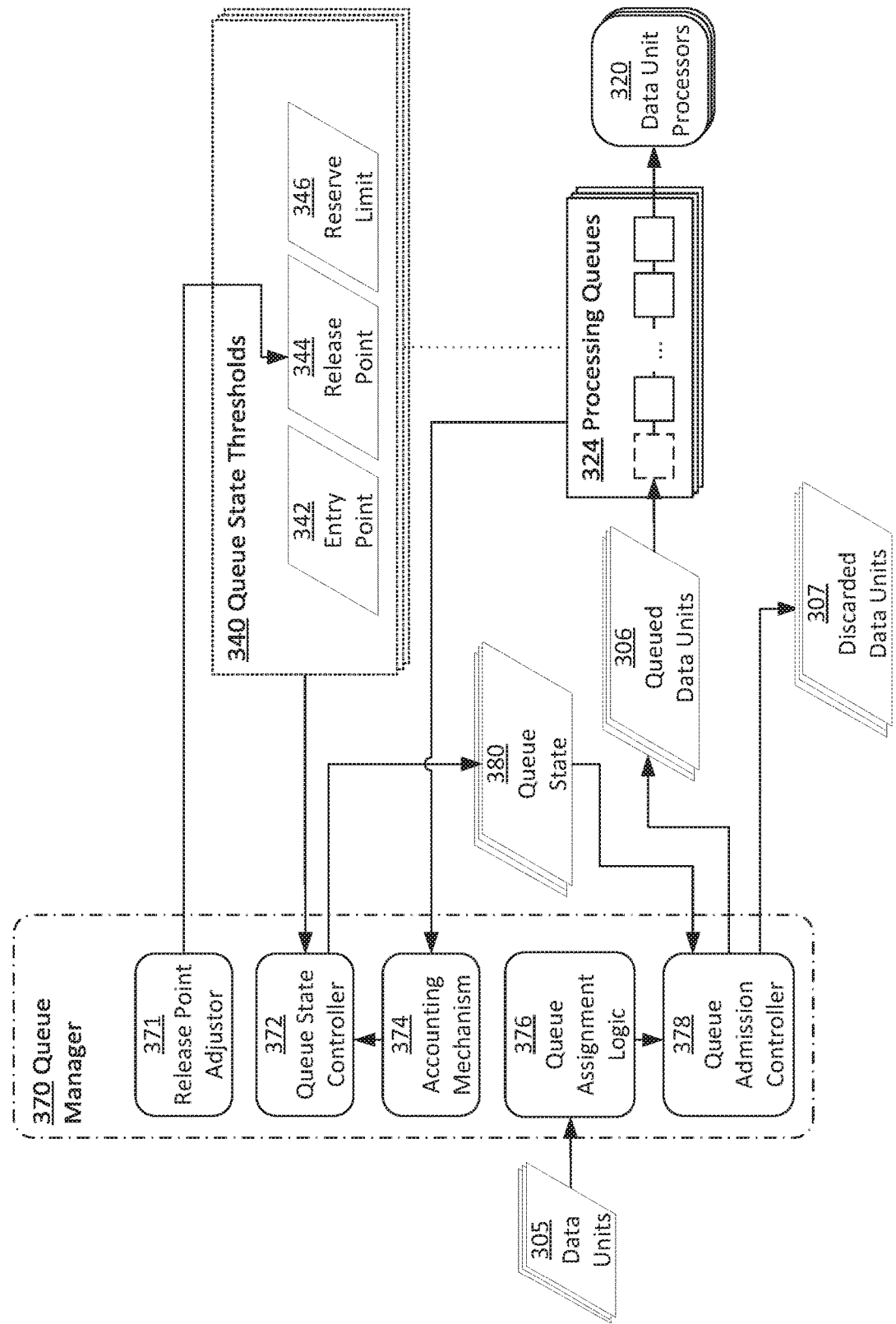
FIG. 3 is an illustrative view of various aspects of an example system in which techniques described herein may be practiced.

FIG. 3 is an illustrative view of various aspects of an example system 300 in which techniques described herein may be practiced, according to an embodiment. System 300 is implemented by a computing device comprising any combination of hardware and software configured to implement the various logical components described herein, including components 321-360. For example, system 300 may be a single networking computing device, such as a router or switch, in which some or all of the processing components described herein are implemented in application-specific integrated circuits (ASICs), field programmable gate arrays (FPGAs), or other integrated circuit(s). As another example, system 300 may include one or more memories storing instructions for implementing various components described herein, one or more hardware processors configured to execute the instructions stored in the one or more memories, and various data repositories in the one or more memories for storing certain data structures utilized and manipulated by the various components.

Figure 2:
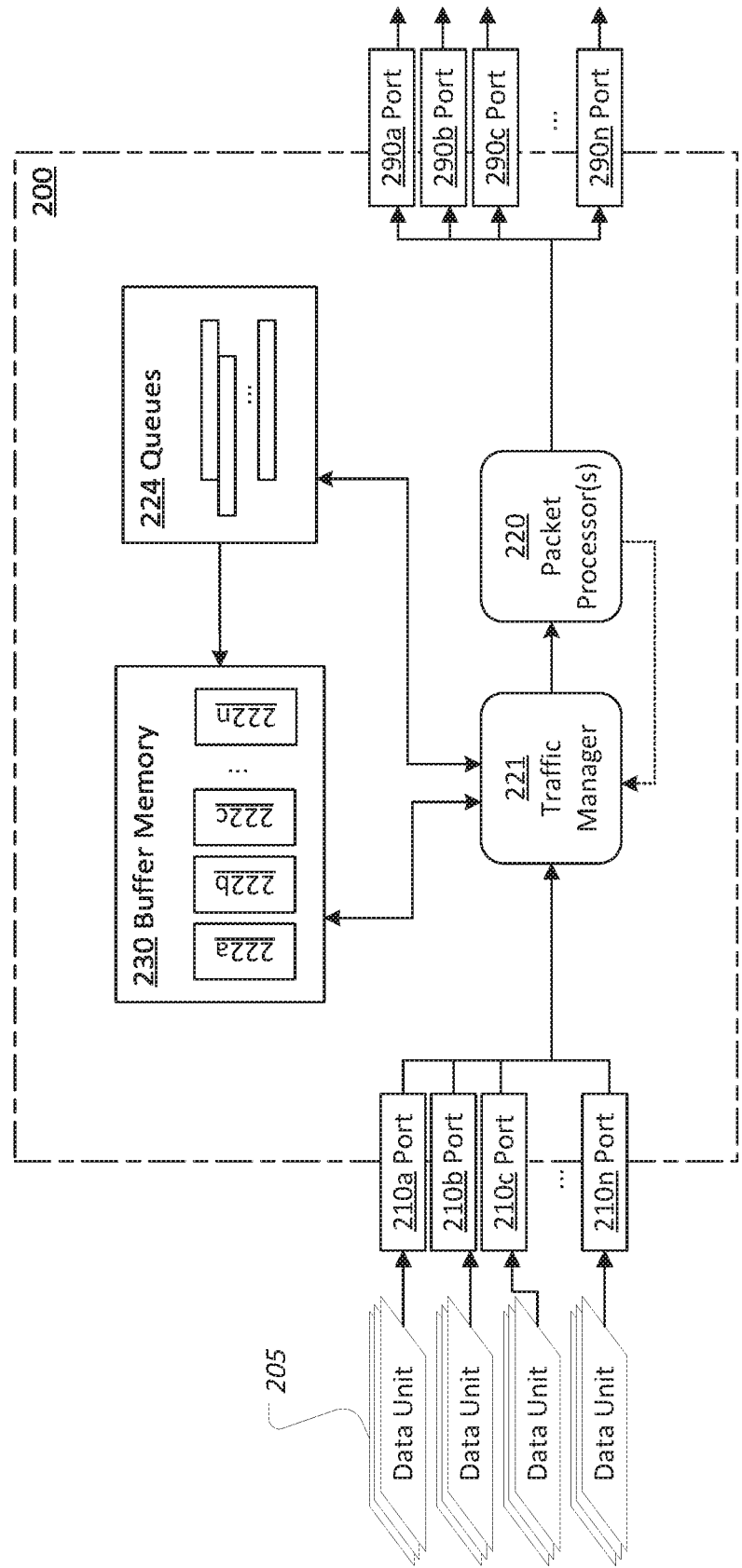
FIG. 2 is an illustrative view of various aspects of an example network device in which techniques described herein may be practiced.

In an embodiment, system 300 is implemented within a network device such as described with respect to FIG. 2. In other embodiments, system 300 may also or instead be implemented within a computing device such as described with respect to FIG. 10. In yet other embodiments, system 300 may be implemented in any suitable device.

2.1. Data Units

System 300 processes various data units 305. Data units 305 may be units of any type of data structure. For instance, in a networking context, data units 305 may be packets, cells, frames, or other datagrams received or sent over a network, as described in other sections. Data units 305 may, in other contexts, include database records, instructions, log entries, and so forth. In some embodiments, each data unit 305 is of a same size, or no greater than a certain size. In other embodiments, each data unit 305 may be a different size.

Data units 305 may be received at system 300 via one or more communication interfaces, received via user interfaces or other interfaces, read from storage media, and/or generated by another component of system 300. Optionally, data units 305 may be processed by other components of system 300 before arriving at the components depicted in FIG. 3, including in some embodiments other instances of the depicted components.

In some embodiments, data units 305 may be logically grouped according to various groupings. Such groupings may pertain, for instance, to the type, source, purpose, or target of the data unit. For example, in a networking context, data units 305 may be assigned to different traffic flows, have different packet types, belong to different service classes, originate from different source ports or devices, target different destination ports or devices, or be otherwise differentiated.

It is often desirable that, within certain sets of groupings, the data units belonging to each group will, on average, receive the same treatment as the data units belonging to each of the other groups in the set. For instance, all things being equal, it may in an embodiment be expected that data units from different source ports will more or less be dropped at an equal rate. The described techniques may, among other aspects, enable better realization of this goal.

2.2. Data Unit Processors

System 300 further comprises one or more data unit processors 320 configured to process data units 305. A data unit processor 320 may process a data unit 305 in a variety of manners. For example, a data unit processor 320 may be a packet processor, as described subsequently, configured to analyze and/or forward a data unit 305 to one or more destinations on a network. A data unit processor 320 may also or instead be configured to process data within the data unit and generate some other data based thereon. Or, as yet another non-limiting example, a data unit processor 320 may determine a location in which to store a data unit 305. In yet other embodiments, a data unit processor 305 may be a general-purpose processor configured to execute one or more instructions within or indicated by a data unit 305.

2.3. Processing Queues

System 300 is configured to receive data units 305 at a rate which may, at times, exceed the rate at which the one or more data unit processors 320 can process the data units 305. Consequently, it may be necessary to temporarily store some of the data units 305 in a buffer memory. Any suitable buffering technique may be utilized to buffer data units 305, and the techniques described herein are not limited to any specific buffering mechanism.

To determine the order in which buffered data units 305 are processed, system 300 arranges the buffered data units 305 in one or more queues 324. Each queue 324 comprises a series of linked nodes. For example, each node may include a forward link to the node immediately before it in the series and/or a backwards link to the node immediately after it in the series, with the exception of the head node at the beginning of the series and/or the tail node at the end of the series. Each node corresponds to a buffered data unit 305. For example, each buffered data unit may actually be a node in the queue 324, or a node in the queue 324 may point to the buffered data unit by means of a corresponding identifier. For convenience of the disclosure, regardless of whether a data unit 305 is actually stored in a queue's node, or linked thereto, the data unit 305 is still said to be "in" the queue.

System 300 comprises queue management logic 370 configured to manage the flow of data units 305 to and through queue(s) 324. Queue management logic 370 is configured to read, receive, or otherwise access data units 305, and place these data units 305 in one or more queues 324. For instance, queue management logic 370 may be implemented within a traffic manager of a network device, such as described in other sections, or any other suitable component.

At various times (e.g. every clock cycle, every other clock cycle, as resources permit, etc.), queue management logic 370 releases a node from an associated queue 324—usually the head node—to a data unit processor 320 for processing. The next node in the queue 324 becomes the head node of the queue 324. This process is referred to as dequeuing. In an embodiment, each data unit processor 320 may be associated with a different queue 324. In other embodiments, there may be more than one queue 324 per data unit processor 320, or a single queue 324 shared by multiple data unit processors 320.

The queue management logic 370 adds data units 305 to queues 324 through a process referred to as enqueuing. For example, when a new data unit 305 arrives, a new node may be created for the new data unit 305 at the tail of the queue 324, and linked to the former tail node. The new data unit 305 thus becomes the last data unit 305 in the series.

Although the examples given relate specifically to embodiments where a queue 324 is a FIFO queue, the techniques described herein may also be applied to embodiments featuring other types of queues 324, including, without limitation, stacks, priority queues, and so forth.

2.4. Queue Assignment

Optionally, in an embodiment featuring more than one queue 324, queue management logic 370 may include queue assignment logic 376. Queue assignment logic 376 is configured to determine to which of the queues 324 a given data unit 305 should be assigned. In an embodiment, the assigned queue 324 for a data unit 305 may be selected based on properties or characteristics of the data unit 305. For instance, in a networking context, data units 305 may be assigned to queues 324 based on their respective source ports, destination ports, traffic flows, service classes, header metadata, or any other suitable characteristic. A data unit 305 may be assigned to multiple queues 324 (e.g. for multicast network traffic).

In a particular network-based embodiment, each queue 324 is an egress queue associated with a different egress port. Hence, each data unit 305 is assigned to the egress queue(s) 324 associated with its destination port(s).

Data units 305 may also be assigned to a queue 324 at least partially randomly, or using load-balancing techniques. In an embodiment, such selection techniques may be used in conjunction with property-based selection. For example, if a data unit 305 has a certain property, and more than one queue 324 is associated with that property, a specific one of the queues 324 may be selected randomly or using a round-robin approach.

2.5. Queue Admission Controller

Queue manager 370 may further optionally include a queue admission controller 378. The queue admission controller 378 is configured to determine whether to admit new data units 305 into the queue(s) 324 to which they have been assigned or otherwise belong. This determination may be made based on a variety of factors, such as whether a queue 324 is in a state that indicates to discard the data unit 305 and/or whether the data unit 305 has characteristics that indicate that the data unit 305 should be discarded. Those data units 305 that are admitted into a queue 324 are referred to as queued data units 306, while other data units 305 become discarded data units 307.

The queue admission controller 378 may further include flow control and/or traffic shaping logic that prevents certain data units 307 from being admitted to queues 324 in order to enforce various bandwidth guarantees for other groups of data units 306. In some embodiments, such logic may be executed only when the queue 324 is in a certain state and/or only for certain types of data units 305. For instance, in an embodiment, a component of system 300 may assign data units 305 to different "color" states depending on one or more attributes of the data units 305. The "color" states may indicate a drop preference for the data units 305 certain contexts. For instance, when a queue 324 is in a certain congestion or fill state (e.g. partially-full, oversaturated, etc.) a certain color state, the queue admission controller 376 may enforce a traffic shaping policy that drops a certain percentage of data units 307 belonging to a lower-priority "red" color state, so as to ensure a certain amount of bandwidth for high priority data units 305 belonging to a "green" color state. Such a policy might not be enforced when the queue 324 is not in the same congestion or fill state.

Discarded data units 307 may be removed from the buffer in which they are stored, and no longer processed by system 300. However, in some embodiments, discarded data units 307 may be sent to a special internal or external subsystem for diagnostic or other purposes.

2.6. Accounting Mechanism

Queue manager 370 includes or is coupled to an accounting mechanism 374 configured to measure a size of each queue 324. The size may be a number of data units 306 in the queue 324, an amount of memory consumed by the data units 306 in the queue 324, a number of buffer entries allocated to the queue 324, or any other similar measure. The accounting mechanism 374 may be implemented in a variety of manners. For instance, the accounting mechanism 374 may maintain a running count of enqueue and dequeue operations for the queue 324. Or, the accounting mechanism may update a running sum of memory allocated to data units 306 in the queue 324 as the data units 306 are enqueued and dequeued. In yet other embodiments, the accounting mechanism 374 may be configured to make a fresh count of all of the data units 306, and/or tabulate their sizes, anytime the size of the queue 324 needs to be known.

In an embodiment, accounting mechanism 374 tracks the size of queue 324 on a delayed basis. Further, the data and/or events based upon which accounting mechanism 374 calculates the size of a queue 324 may exhibit some amount of delay. Hence, the measure of the size of a queue 324 at any given time may be an approximate measure, that does not necessarily always or ever exactly reflect the current state of the queue 324. In an embodiment, the measured size may in fact generally lag some number of clock cycles behind the actual size of the queue 324.

Multiple measures of size may be tracked. For example, there may be a total size of the queue 324, as well as group-specific "sizes" of the queue 324. For instance, the number of data units 305 from a certain source or having a certain attribute may be tracked as well.

In an embodiment, the accounting mechanism 374 includes, for each tracked queue size, a frequently-updated intermediate counter stored in a faster memory, and an infrequently updated full counter stored in a slower but less expensive memory. The intermediate counter is updated for each enqueue and dequeue operation. The full counter for a given queue 324 may only be updated to reflect the latest changes to the intermediate counter at intermittent times (e.g. once every ten clock cycles, once every twenty clock cycles, etc.). When the size of a queue 324 needs to be known, the latest value of the full counter is reported. The accounting mechanism 374 may, for instance, update the full counter for only a small subset of queues 324 each clock cycle, with the subset being chosen using a round robin approach and/or based on which queues 324 exhibit a high level of recent activity or are in a certain state. A background scheduler may dictate which counters are updated in any given clock cycle. Some examples of such accounting mechanisms are described in U.S. patent application Ser. No. 14/958,830, entitled "Efficient Resource Tracking," by Matthews et al., filed Dec. 3, 2015, the entire contents of which are hereby incorporated by reference for all purposes, as if set forth in their entirety.

2.7. Queue State Controller

Queue manager 370 further comprises a queue state controller 372. The queue state controller 372 monitors the measured size(s) of queue(s) 324 and updates queue state information 380 based thereon. The queue state information 380 for a queue 324 indicates whether the queue is in any of one or more possible queue states. The determined queue state information 380 may be sent directly to one or more other components of system 300, or stored in any suitable memory.

For each possible state that a queue 324 may be in, queue state controller 372 compares a current size of the queue 324, as reported by accounting mechanism 374, to various thresholds 340 for the state to determine whether the queue 324 is in that state. Specifically, each state has an entry point 342 and a release point 344. When the measured queue size relevant to that state reaches (e.g. surpasses, or is at least equal to, depending on the embodiment) the state entry point 342 for a particular state, assuming the queue 324 is not already in the particular state, the queue state controller 372 updates the queue state information 380 for that queue 324 to indicate that the queue 324 is in the particular state. However, the queue 324 does not automatically exit the particular state when the size falls back below the particular state's entry point. Rather, the queue state controller 372 only updates the queue state information 380 to indicate that the queue 324 is no longer in the particular state when the size falls back below a release point 344 for the state. The release point 344 is set to some size lower than the entry point, so as to reduce the potential for rapidly transitioning to and from a certain state many times in a short period as the queue size straddles the entry point 342.

As used herein, the term "transitioning" refers to any process(es) related to the updating of the queue state information 380 to indicate that the queue 324 has entered or exited a certain state. Transitioning may involve simply updating the queue state information 380, or transitioning may involve additional actions such as updating related metadata, waiting for certain operations to be performed before updating the state information 380 to avoid inconsistencies, or executing other tasks immediately triggered by the state change.

State thresholds for each particular state may be specific to a queue 324 or type of queue 324. Or, state thresholds for a particular state may be global for all queues 324. Certain state threshold information 340 may be fixed, or configurable by an administrator of the system 300. In embodiments with more than one state, there may be different queue state thresholds 340 for each state.

Some states may be determined using different size measures than other states. For instance, a source-specific or type-specific congestion state may be determined using only a count of the number of data units of the specific source or type within the queue 324, while a general congestion state would be determined using a total size measure of the queue 324.

The queue state information 380 may be reported to or accessible by a variety of depicted and undepicted components of system 300, which may be configured to take various actions based thereon. For example, some or all of the queue state information 380 may be reported to the queue admission controller 378, which may be configured to determine whether to admit data units 305 into assigned queues 324 based on the currently reported states of the assigned queues 324. Or, admission controller 378 may be configured to manipulate data units 306 in some fashion as the data units 306 are enqueued, such as by marking the data units 306 with a certain tag. Similarly, data unit processors 320 may be configured to access queue state information 380 to determine how to handle certain data units 306 as they are dequeued.

Other components of system 300 may take actions based on queue state information 380, that are less directly related to data units 305. For instance, an ingress processor or traffic manager may slow the ingress of certain types of data units 305 when a queue 324 is in a certain state. Or, a statistics component may begin collecting certain statistics when a queue 324 is in a certain state. Or, a reporting component may send a certain message when a queue 324 is in a certain state.

The possible queue states will vary depending on the embodiment. For instance, the queue states may include a discard state, that indicates to queue admission controller 378 when to discard certain data units 307, so as to avoid overfilling the queue 324. The discard state may be relative to all data units 305, or only to a subset of the data units 305. Moreover, there may be different discard states associated with different types or sources of data units 305. A variety of other global or group-specific states may exist, each with their own implications. For instance, in a networking context, states may include states corresponding to different levels of congestion or activity, states corresponding to different tags with which to mark data units 305, states corresponding to reporting or debugging levels, and so forth.

In an embodiment, a single queue state may characterize a group of queues 324 instead of a single queue 324. For instance, accounting mechanism 374 may measure an average or total size of a group of queues 324 that share a common characteristic. Queue state threshold information 340 may be maintained for this average or total size. When the average or total size surpasses the associated state entry point 342, the entire group of queues 342 is said to be in the associated state. This group state may be used separately from or in addition to individual queue states. For instance, a first queue 324 may not be in a discard state individually, but may nonetheless be in a discard state for an entire group of queues 324, because the group of queues 324 is overloaded on the whole.

In an embodiment, to reduce resource requirements, queue state controller 372 is configured to determine and update queue state information 380 for a given queue 324 only at intermittent intervals. These intervals may be periodic, or a function of the current operating context. In an embodiment, the queue state information 380 for a queue 324 is only determined and updated at the same time as the size(s) of the queue 324 are measured or updated.

In an embodiment, the queue state thresholds 340 include a reserve limit 346. This reserve limit is a minimum size guaranteed to the associated queue 324. The release point 344 should be between the reserve limit 346 and the entry point 342.

Example Queue

Figure 4:
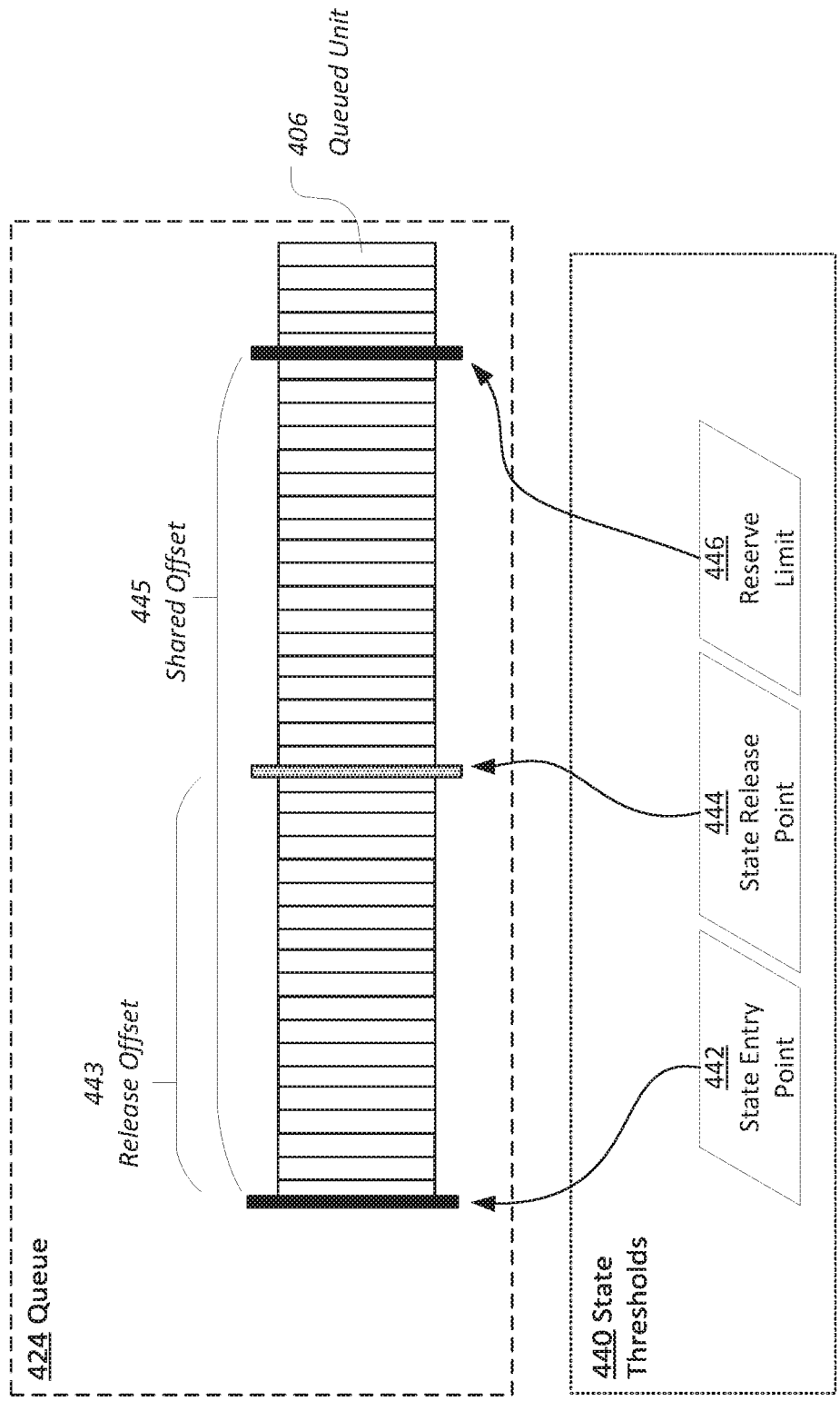
FIG. 4 illustrates an example queue with respect to the thresholds for a particular state.

FIG. 4 illustrates an example queue 424 with respect to the thresholds 440 for a particular state, according to an embodiment. Queue 424 is an example depiction of a queue 324, though queue 424 may be utilized in systems other than system 300. Likewise, state thresholds 440 are an example of state thresholds 340.

Queue 424 comprises a number of individual data units 406, each of which is illustrated as segments within a stacked horizontal bar graph representing queue 424. The head of the queue 424 is the right-most data unit 406, while the tail of the queue 424 is the left-most data unit 406. The relative sizes of the state entry point 442, state release point 444, and reserve limit 446 are illustrated as markers against the bar graph. As illustrated, the number of queued units 406 has surpassed both the reserve limit 446 and the release point 444. In fact, the size of the queue 424 has reached the state entry point 442, and thus the queue 424 is said to be in the associated state. The queue 424 will remain in this state until the number of queued units 406 shrinks to the release point 444.

The release point 444 is illustrated using a different marker than the state entry point 442 and the reserve limit 446, to indicate that the release point 444 moves over time, as shall be further explained. Also illustrated are a release offset value 443 and shared offset value 445, which may in some embodiments relate to the manner in which the release point 444 changes over time.

2.8. Release Point Adjustor

Returning to FIG. 3, system 300 further includes release point adjustment logic 371 configured to adjust release point(s) 344 frequently over time, thereby varying the requisite size(s) to which the associated queues 324 must shrink before they transition away from the associated states. Whereas, with a fixed queue size, the state of a queue 324 might manifest periodic patterns in the intervals at which it remained in a certain state, the release point adjustor 371 may introduce some variability into these intervals that reduces the likelihood of such patterns.

In an embodiment, the release point adjustor 371 randomly or pseudo-randomly varies the release point 344 for a state between the entry point 342 for the state and the reserve limit 346 for that state. The exact range of values to which the release point 344 may be set may further be limited so that the release point 344 is at least some minimum distance from the entry point 342 and the reserve limit 346.

Any suitably random or pseudo-random mechanism may be used to select the release point 344, such as a linear-feedback shift register. In an embodiment, a randomly or pseudo-randomly selected value is the release point 344. In other embodiments, the randomly or pseudo-randomly selected value is a "seed" value that is inputted into a function that computes the release point 344 (e.g. using the reserve limit 346 and entry point 342). In an embodiment, a complex repeating or non-repeating pattern may be utilized in place of a randomization mechanism to select a release point or seed value.

In some embodiments, each queue's state release point(s) 344 vary in a different manner (e.g. using a different seed value). In other embodiments, each state release point 344 may vary in the same manner (e.g. using a same seed value).

The rate at which the release point adjustor 371 varies release points 344 may be fixed or variable, depending on the embodiment. In an embodiment, for instance, a certain number of release points 344 are adjusted each clock cycle, selected in round-robin fashion. In an embodiment, a scheduler may schedule release points 344 for adjustment in advance based on various factors. In an embodiment, the scheduler increases the frequency with which a release point 344 is adjusted when the associated queue 324 is in a certain state, or in proportion to a measured size of the queue 324. In an embodiment, a release point 344 is only scheduled for adjustment when the associated queue 324 is in the state associated with the release point 344.

In an embodiment, release points 344 for a queue 324 are adjusted at the same time as the state information 380 and/or sizes of the queue 324 are updated.

2.9. Miscellaneous

System 300 illustrates only one of many possible arrangements of components configured to provide the functionality described herein. Other arrangements may include fewer, additional, or different components, and the division of work between the components may vary depending on the arrangement. For example, in some embodiments, assignment logic 376 and/or admission controller 378 may be omitted, along with any other components relied upon exclusively by the omitted component(s). As another example, in an embodiment, system 300 may be configured to never discard a data unit 305. In yet another embodiment, the reserve limit 346 is optional or implicit (e.g. 0).

3.0. FUNCTIONAL OVERVIEW

The various elements of the process flows described below may be performed in a variety of systems, including system 300 described above. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Enqueuing Data Units

Figure 5:
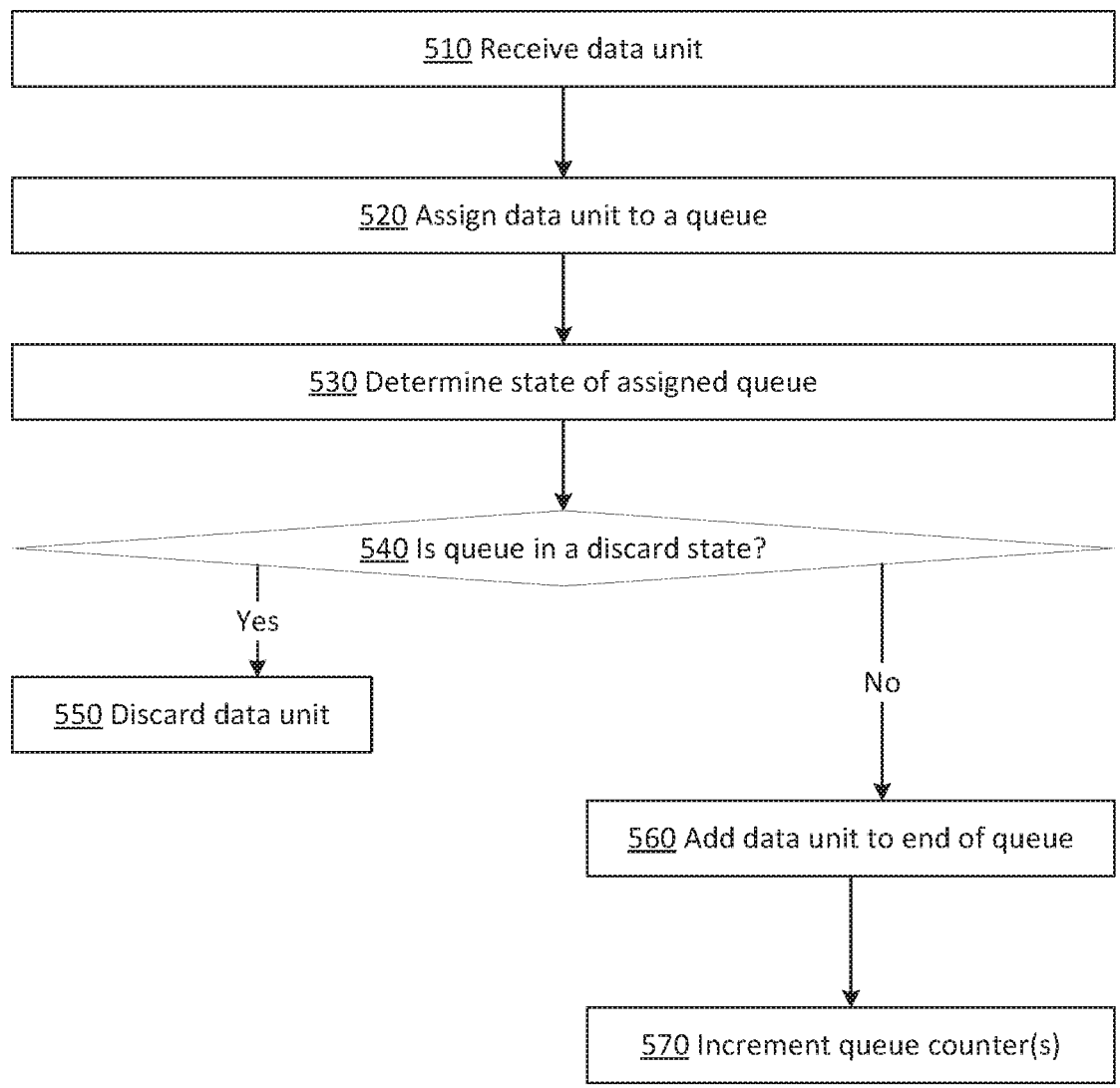
FIG. 5 illustrates an example flow for enqueuing data units.

FIG. 5 illustrates an example flow 500 for enqueuing data units according to an embodiment. Block 510 comprises receiving, or otherwise accessing, a data unit. The data unit may be any type of data unit, such as a data unit 305. The data unit may be received at any component of a computing device, such as at queuing logic 370 of FIG. 3 and/or a traffic manager 221 of FIG. 2.

Block 520 comprises assigning a data unit to a specific queue, such as to a queue 324 or 424. The data unit may be assigned to a queue based on any suitable factor, such as a being targeted to a processing component or other destination associated with the queue, having originated or been relayed through a source component associated with the queue, have a data type associated with the queue, having other metadata associated within the queue, having been assigned or mapped to flow associated with the queue, and so forth. Data units may also or instead be assigned to a queue at random, using a round-robin approach, or using a load-balancing approach.

Block 530 comprises determining the state of the assigned queue, such as by reading previously stored state information for the queue, or receiving an indicator of the state from a state controller.

Block 540 comprises determining whether the queue is in a discard state. In an embodiment, there may be more than one type of discard state for the queue. For instance, there may be a global discard state for the queue or a group of queues, and one or more attribute-specific discard states that pertain only to data units having certain attributes. If the queue is in any type of discard state relative to the data unit, then in block 550, the data unit is discarded. Otherwise, flow 500 proceeds to block 560.

Block 560 comprises adding the data unit to the end (i.e. tail) of the queue. For instance, a new node may be created and linked to the previous tail node in the queue (if any). The new node may include the data unit, or an identifier by which the data unit may be located (e.g. a buffer address, a sequence number, etc.).

Block 570 comprises incrementing one or more queue counters. The counters may be incremented by a single unit, where the size of the queue is tracked solely in terms of the number of data units therein, or by an amount corresponding to the size of the data unit in other embodiments. There may be counters for the total size of the queue, the total size of a group of queues, a count of the number of data units within the queue that have a certain attribute, and/or any other suitable measure.

Flow 500 may be repeated for any number of data units assigned to any number of queues.

Flow 500 illustrates only one of many possible flows for enqueuing a data unit. Other flows may include fewer, additional, or different elements, in varying arrangements. For instance, in some embodiments, blocks 530-550 are omitted, and a data unit is always enqueued. In another embodiment, instead of or in addition to block 540, a flow for enqueuing a data unit may include determining whether the queue is in another type of state. If so, an action associated with that state is performed prior to block 560. Otherwise, the action is not performed. Any number of states and associated actions may be evaluated for.

3.2. Dequeuing Data Units

Figure 6:
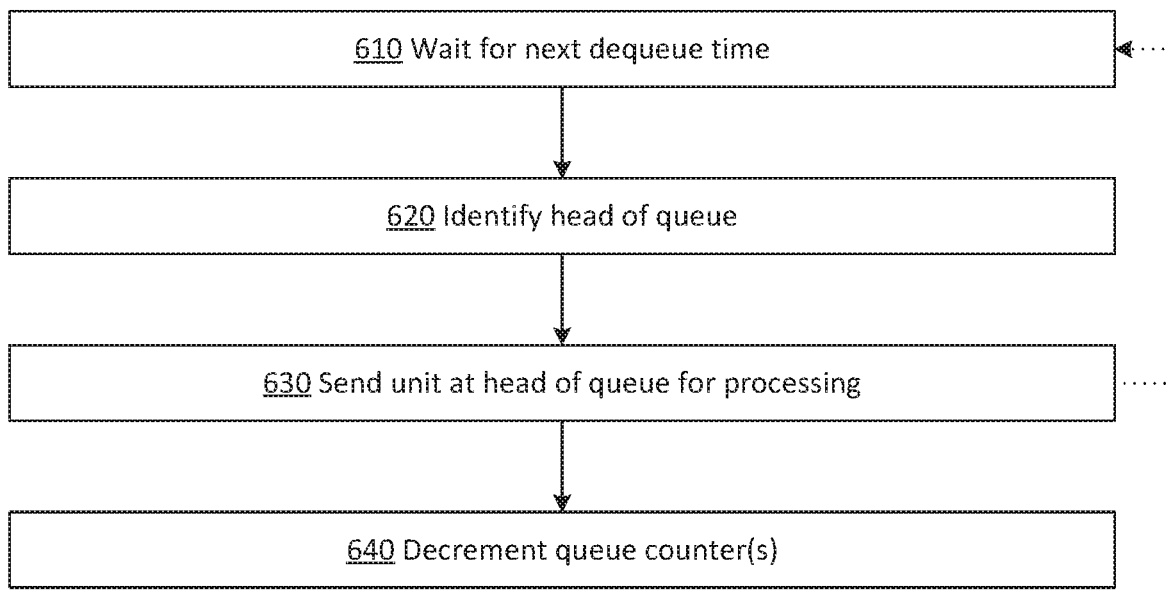
FIG. 6 illustrates an example flow for dequeuing a data unit from a queue.

FIG. 6 illustrates an example flow 600 for dequeuing a data unit from a queue, such as a data unit that was at some point added to a queue in an iteration of flow 500, according to an embodiment. Flows 500 and 600 may be performed concurrently, such that some data units are being enqueued at the same time, or within the same time frame, as other data units are being dequeued at the same time.

Block 610 comprises waiting for a next dequeue time. Data units may be dequeued at varying times, depending on the embodiment. For instance, in an embodiment, a data unit may be dequeued once each clock cycle, or other time slot. In an embodiment, a data unit may be released when a processing component associated with the queue indicates that it is ready for a new data unit. In yet other embodiments, dequeues may be scheduled based on resource availability.

Block 620 comprises, at the next dequeue time, identifying the head of the queue. Typically, metadata indicating the head data unit will be stored with the queue, such that the head data unit is readily identifiable. However, the head data unit may also be identified by traversing node links or using any other suitable means.

Block 630 comprises sending the data unit at the head of the queue to a processing component for processing. For instance, the data unit may be sent to a packet processor, a general-purpose processor, or any other suitable processing logic. In an embodiment, the processing may include a state check, whereby the processing action taken is a function of a current state of the queue. In an embodiment, processing of the data unit may involve sending the data unit to another component or device associated with the queue and/or determined during the processing.

Block 640 comprises decrementing one or more counters associated with the queue, in reverse manner to the incrementing of block 570. That is, every counter that was incremented in block 570 when the data unit was enqueued is decremented by the same amount when the data unit is dequeued in block 640.

Flow 600 may be repeated for any number of data units. Moreover, multiple instances of flow 600 may be performed concurrently, with respect to different queues.

Flow 600 illustrates only one of many possible flows for dequeuing a data unit. Other flows may include fewer, additional, or different elements, in varying arrangements. For example, in another embodiment featuring other types of queues, other data units besides the head data unit may be selected for processing.

3.3. Updating Queue State

Figure 7:
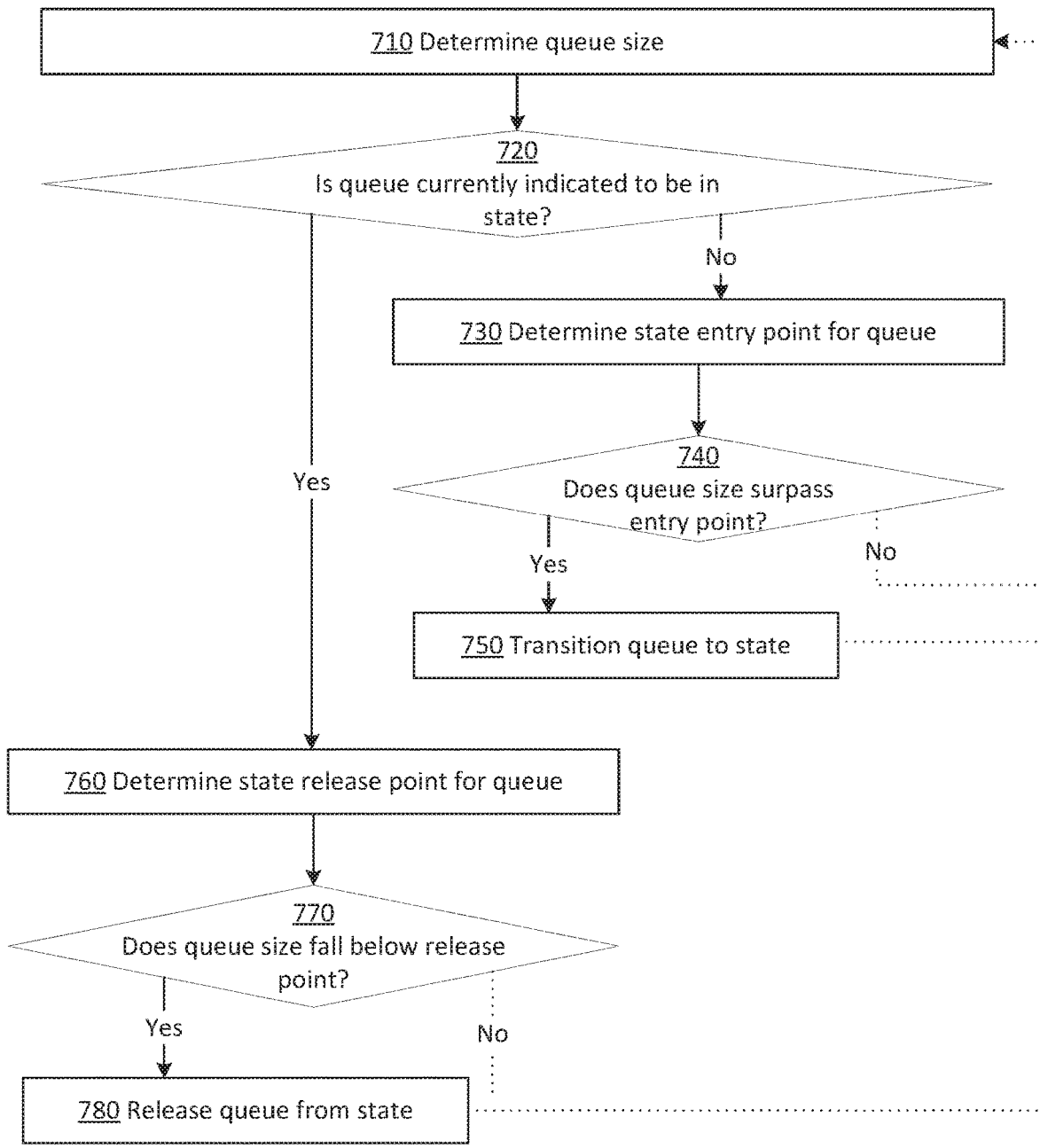
FIG. 7 illustrates an example flow for updating state information for a queue.

FIG. 7 illustrates an example flow 700 for updating state information for a queue, such as a queue to which data units are enqueued in flow 500, according to an embodiment. The state information that is accessed in block 530 of flow 500 may, in an embodiment, be generated and updated through performance of block 700, either in advance of block 530, or on demand. Flow 700 may be performed as data units are being enqueued and dequeued, thus changing the size of the queue.

Block 710 comprises determining a queue size. For example, the queue size may be determined by reading a counter that was updated in blocks 640 and/or block 570. Or, the queue size may be determined by reading any other suitable counter. Depending on the state information being updated, the determined size may be a total size of the queue, or an attribute-specific size, such as the number of data units in the queue that have a certain attribute. The queue size need not be the actual size at the time block 710 is performed, but rather may be a delayed measure, as explained in other sections.

Block 720 comprises determining whether the queue is currently indicated as being in the state whose state information is being evaluated. That is, if flow 700 is being performed to characterize the state of the queue with respect to a discard state, block 720 comprises determining whether the queue is currently indicated to be in the discard state.

If not, flow 700 proceeds to block 730. Block 730 comprises determining a state entry point for the queue. There may be, for example, a table of state thresholds such as state thresholds 340, in which each row stores thresholds for a different queue and/or state. Or, the entry point may be read, calculated, or otherwise determined using any other suitable means.

Block 740 then comprises determining whether the queue size determined in block 710 surpasses the state entry point determined in block 730. As used herein, "surpasses" may include being equal to, depending on the embodiment.

If the queue size surpasses the state entry point, then flow 700 proceeds to block 750. Block 750 comprises transitioning the queue to the state. Transitioning may include, for instance, updating stored state information for the queue to indicate that the queue is in the state, waiting for one more locking conditions to pass, triggering one or more state-related actions, or any other suitable actions.

If the queue size does not surpass the state entry point, then flow 700 returns to block 710.

Returning to block 720, if the queue is already indicated to be in the state, then flow 700 proceeds to block 760. Block 760 comprises determining the state release point for the queue. This may comprise, for instance, reading the state release point from a table or other memory, in similar manner to the state entry point. Alternatively, block 760 may comprise actually calculating a state release point, using techniques such as described in other sections.

Block 770 comprises determining whether the queue size determined in block 710 falls below the release point determined in block 760. As used herein, "falls below" may include being equal to, depending on the embodiment.

If the queue size falls below the release point, then flow 700 proceeds to block 780. Block 780 comprises releasing the queue from the state. Releasing the queue from the state, or transitioning away from the state, may include, for instance, updating stored state information for the queue to indicate that the queue is no longer in the state, waiting for one more locking conditions to pass, triggering one or more state-related actions, or any other suitable actions.

If the queue size does not fall below the state release point, then flow 700 returns to block 710.

Flow 700 may be performed concurrently for multiple queues at the same time. Flow 700 may further be performed concurrently for multiple states for the same queue at the same time. Where resources are limited, each loop of flow 700 may include a step of waiting for a next scheduled time to continue evaluating the associated queue state. For instance, after a negative determination in block 740, flow 700 may wait some number of clock cycles before looping back to block 710, so that other instances of flow 700 execute.

Flow 700 illustrates only one of many possible flows for updating queue state information. Other flows may include fewer, additional, or different elements, in varying arrangements. For example, in another embodiment, block 710 might be performed after blocks 720 and/or blocks 730/760. Such arrangements of flow 700 may avoid repeatedly performing block 720 by looping within the two branches of block 720 until a positive determination is reached in block 740 or block 770.

3.4. Adjusting Queue Release Point

Figure 8:
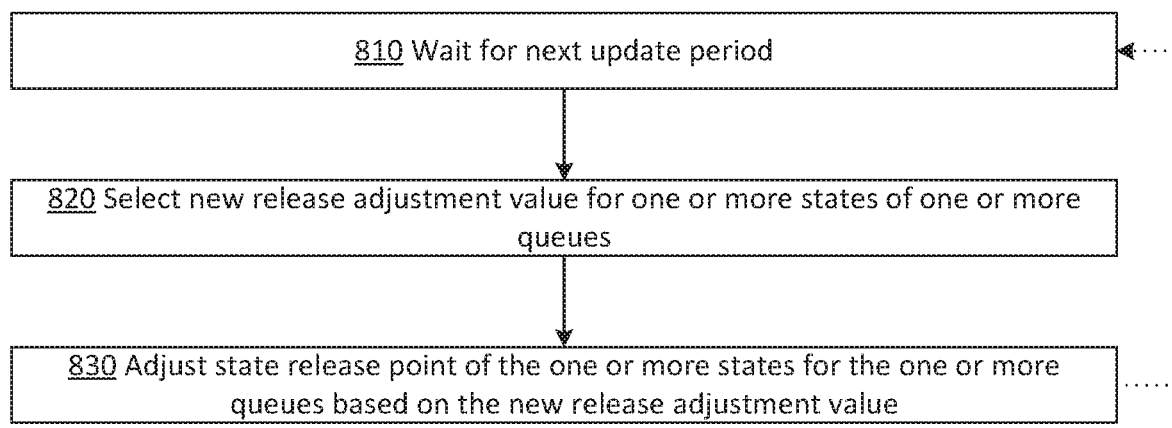
FIG. 8 illustrates an example flow for adjusting a state release point for a queue.

FIG. 8 illustrates an example flow 800 for adjusting a state release point for a queue, such as the state release point utilized in blocks 760/770 of flow 700, according to an embodiment. Flow 800 may be performed concurrently with, and at any time relative to flow 700.

Block 810 comprises waiting for a next update period for adjusting the state release point. In an embodiment, update periods may occur, for a given queue and/or state, on a regular basis (e.g. every ten time slots, etc.). In an embodiment, update periods may be scheduled in advance in round-robin fashion for all queues and states, as resources become available. In an embodiment, update periods may be scheduled based on a variety of factors, such that the release points for queues and/or states meeting certain criteria are updated more frequently. For instance, the release point for a state that a queue is already in may be scheduled for adjustment more frequently than a release point for a state that a queue is not in.

In an embodiment, the release point adjustment update period may be aligned with a state update period and/or counter update period, as described elsewhere herein. In an embodiment, for example, a system may comprise a background process configured to update all three of these types of values, and/or a scheduler configured to determine when to schedule these updates based on the same or similar factors.

Block 820 comprises selecting a new release adjustment value for one or more states of one or more queues. The adjustment value may be selected in a variety of manners. In an embodiment, the adjustment value may be selected randomly or pseudo-randomly. For instance, some or all of the bits from a linear-feedback shift register ("LFSR") may be selected. Alternatively, the adjustment value may be selected from a sufficiently complex pattern of values.

In an embodiment, the adjustment value may be computed based on current system metrics, such as a level of congestion or activity, or the size of a counter. For instance, the size of the adjustment value may increase in proportion with the system metric. In an embodiment, each queue's and/or state's adjustment value may be based on a different, but related metric.

In an embodiment, each state of each queue may have its own adjustment value. Alternatively, all states for a queue may have a single adjustment value, and/or all states of similar types may have the same adjustment value across all of the queues.

Block 830 comprises adjusting the state release point of the one or more states for the one or more queues based on the adjustment value. In some embodiments, the adjustment value is the new release point. In other embodiments, the adjustment value is inputted into a function to calculate the new release point for a given state. For instance, the function may scale the adjustment value to fit within a range approximately equal to the distance between the entry point and reserve limit for the state, or some other range derived therefrom. The function may involve any suitable mathematical operations.

Flow 800 illustrates only one of many possible flows for updating queue state information. Other flows may include fewer, additional, or different elements, in varying arrangements.

3.5. Reserve-Limit Based Calculation of Release Point

Figure 9:
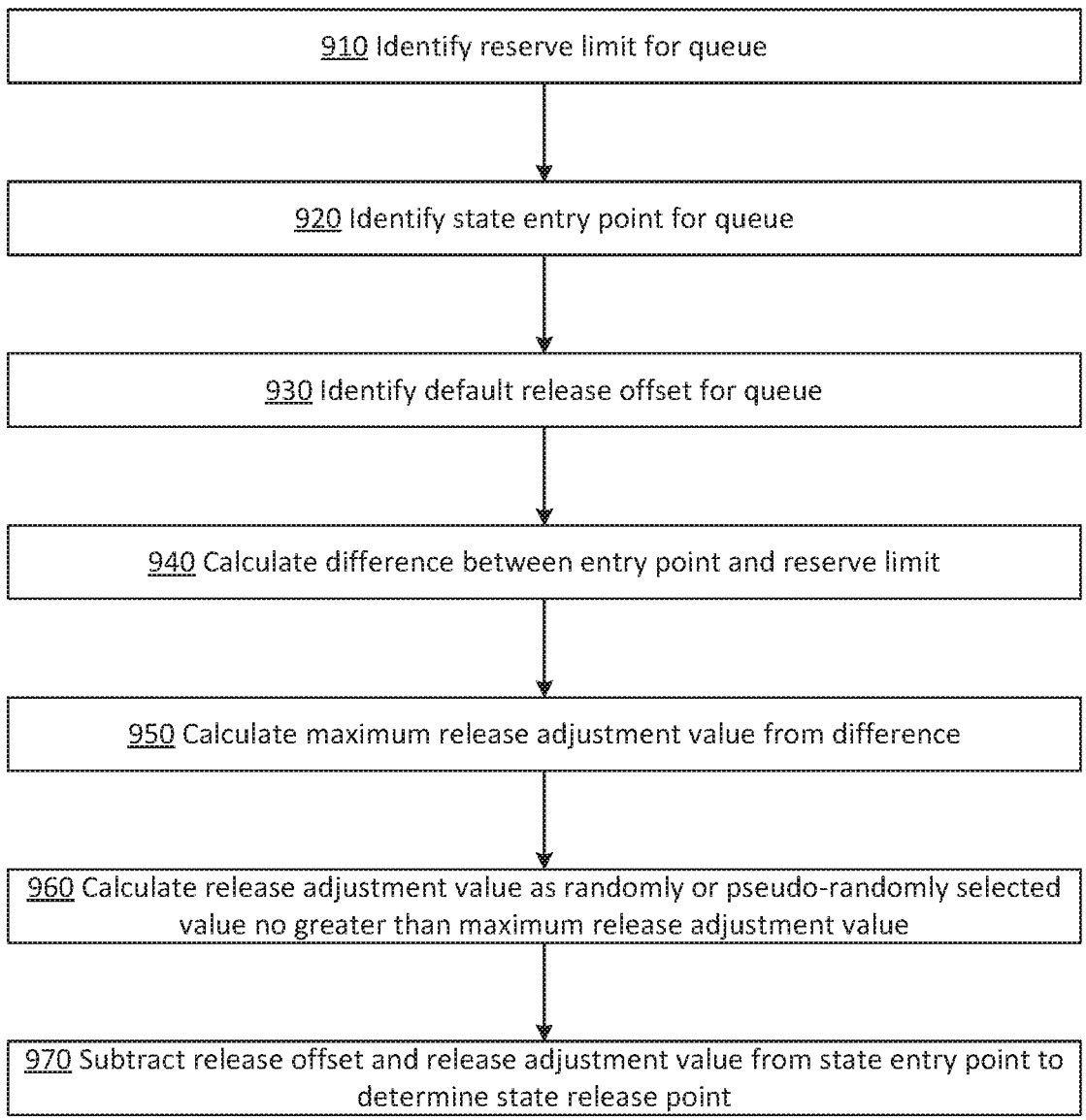
FIG. 9 illustrates an example flow for calculating a release point for a queue state based on a reserve limit for that state.

FIG. 9 illustrates an example flow 900 for calculating a release point for a queue state based on a reserve limit for that state, such as reserve limit 446, according to an embodiment. Flow 900 is one example of a flow suitable for accomplishing blocks 820 and 830 of FIG. 8, but may also be used in other contexts.

Block 910 comprises identifying the reserve limit for the queue. Block 920 comprises identifying the state entry point for the queue. Block 930 comprises identifying the default release offset for the queue. These values may be read from a memory, received from another component, calculated based on other values, or identified in any other suitable manner. The default release offset is a default distance between the state entry point and the state release point (i.e. without any adjustment), which may be pre-configured on a global, per-queue, or per-state basis.

Block 940 comprises calculating a difference between the entry point and reserve limit. This difference may also be referred to as a shared offset, and may be stored rather than calculated anew when needed.

Block 950 comprises calculating a maximum release adjustment value from this difference. The maximum release adjustment value should be no greater than this difference. The maximum release adjustment value may in fact be significantly less than this difference. For instance, the maximum release adjustment value may be a function of this difference (e.g. half of the difference, a rounded value based on the difference, etc.). This value may likewise be stored rather than calculated anew when needed.

Block 960 comprises calculating the release adjustment value as randomly or pseudo-randomly selected value no greater than the maximum release adjustment value. A non-random value may alternatively be selected from a pattern of sufficient complexity.

Block 970 comprises subtracting the default release offset and calculated adjustment value from the state entry point to determine the state release point.

Flow 900 illustrates only one of many possible flows for updating queue state information. Other flows may include fewer, additional, or different elements, in varying arrangements.

4.0. IMPLEMENTATION EXAMPLE

Example release point adjustment logic is now described. The example logic is but one example of many possible arrangements of such logic. While the logic is described in a networking context with respect to a discard state, the logic may be extended to other contexts and other states.

Admission logic in a traffic manager evaluates the discard state for each set of k queues periodically as a part of its evaluation sequence. During evaluation, if a queue is in a discard state, the queue may be released from that state if its total queue count (e.g. number of fixed-size cells) falls below its release limit. The release limit (i.e. release point) is computed as an offset from the queue's discard limit (i.e. the entry point for the discard state) at that time. This is computed as the discard limit minus the adjusted release offset value, as described below. If this computed value is less than the reserved limit for the queue, then the release limit is set equal to the reserved limit. This approach ensures that the release limit is always at least as great as the reserve limit.

On evaluation of whether to exit the discard state, a random value is added to a pre-configured release offset value prior to performing the above computation of the release limit. The aim of this mechanism is to randomize when the queue will be released from a discard state so as to enable different source ports to gain access to the egress queue over time.

To compute the random value, a value N is set to the bit position of the most significant bit ("MSB") of a shared_offset value. A value X is then calculated by subtracting from N a pre-configured value, RELEASE_ADJ_EXP_OFFSET. If the computed X value is less than 1, then X is set to 1.

The value RELEASE_ADJ_EXP_OFFSET is a pre-configured value that may be utilized to constrain the magnitude of the adjusted release offset. The adjusted release offset is then computed using a pre-configured base value of release_offset plus a randomly generated value between 0 and $2^{(X-1)}$.

In an embodiment, the randomization function is as follows. Based on the bit position of the MSB of the shared_offset value, a number of bits is selected from the lower bits of an LFSR and used to add to the release_offset when computing the release_limit.

The random value added to the release offset is updated periodically as a function of the number of update rounds. The same random value may be used for all queues during evaluation until it is updated again. The frequency of the update to the random value is determined based on a user configuration.

5.0. EXAMPLE EMBODIMENTS

Examples of some embodiments are represented, without limitation, in the following clauses:

According to an embodiment, a method comprises: receiving a plurality of data units over time; enqueuing at least certain data units of the data units in a queue; dequeuing the certain data units from the queue for processing by a processing component associated with the queue; repeatedly updating queue state information during said enqueueing and dequeuing, comprising: transitioning to a first state upon determining that the queue is of a size that surpasses a state entry threshold; transitioning away from the first state upon determining that the queue is of a size that falls below a state release threshold, the state release threshold being lower than the state entry threshold; repeatedly adjusting the state release threshold during said enqueueing and dequeuing; and determining one or more actions to take with respect to particular data units of the data units based on a current state indicated by the queue state information.

In an embodiment, determining the one or more actions comprises, when the queue is in the first state, determining to discard first data units assigned to the queue without enqueueing the first data units in the queue.

In an embodiment, determining the one or more actions comprises, when the queue is in the first state, determining to mark first data units assigned to the queue using a particular tag associated with the first state.

In an embodiment, repeatedly adjusting the state release threshold is based on randomly or pseudo-randomly selected values, the method further comprising selecting the randomly or pseudo-randomly selected values from a range of values spanning no more than a difference between the state entry threshold and a reserve threshold.

In an embodiment, the method further comprises ensuring that release threshold is always greater than a reserve threshold, the reserve threshold being greater than zero.

In an embodiment, repeatedly adjusting the state release threshold is based on randomly or pseudo-randomly selected values, the method further comprising: determining a difference between a reserve threshold and the state entry threshold; determining a bit position of a most significant bit in the difference; selecting the randomly or pseudo-randomly selected values by selecting a number of bits from a linear-feedback shift register, the number of bits determined by the bit position of the most significant bit in the difference.

In an embodiment, the data units are network packets, cells, or frames, wherein the queue is one of a plurality of egress queues of a network device, each associated with a different egress port, and wherein the processing component is configured to forward the certain data units to a destination on a network.

In an embodiment, the certain data units include data units from different groups, the different groups be associated with either different source ports or different traffic flows.

In an embodiment, repeatedly adjusting the state release threshold comprises adjusting the state release threshold more frequently when the queue is of a higher size.

In an embodiment, repeatedly adjusting the state release threshold comprises updating the queue state information more frequently when the queue is of a higher size.

In an embodiment, the size of the queue is a count of data units enqueued within the queue; wherein repeatedly updating the queue state information comprises updating the queue status information using a background process in a same time slot as the count is updated.

According to an embodiment, a system comprises: one or more communication interfaces configured to receive a plurality of data units over time; one or more data unit processors configured to process the data units; queue admission control logic configured to enqueue at least certain data units of the data units in a queue; queue management logic configured to dequeue the certain data units from the queue for processing by a particular data unit processor associated with the queue; queue state control logic configured to repeatedly update queue state information during said enqueueing and dequeuing, by at least: transitioning to a first state upon determining that the queue is of a size that surpasses a state entry threshold; transitioning away from the first state upon determining that the queue is of a size that falls below a state release threshold, the state release threshold being lower than the state entry threshold; state release point adjustment logic configured to repeatedly adjust the state release threshold during said enqueueing and dequeuing; wherein at least one of the queue admission controller or the particular data unit processor is configured to determine one or more actions to take with respect to particular data units of the data units based on a current state indicated by the queue state information.

In an embodiment, the queue admission controller is further configured to determine the one or more actions by, when the queue is in the first state, determining to discard first data units assigned to the queue without enqueueing the first data units in the queue.

In an embodiment, the state release point adjustment logic is further configured to adjust the state release threshold based on randomly or pseudo-randomly selected values, selected from a range of values spanning no more than a difference between the state entry threshold and a reserve threshold.

In an embodiment, the state release point adjustment logic is further configured to adjust the state release threshold based on randomly or pseudo-randomly selected values, by: determining a difference between a reserve threshold and the state entry threshold; determining a bit position of a most significant bit in the difference; selecting the randomly or pseudo-randomly selected values by selecting a number of bits from a linear-feedback shift register, the number of bits determined by the bit position of the most significant bit in the difference.

In an embodiment, the data units are network packets, cells, or frames, wherein the queue is one of a plurality of egress queues of a network device, each associated with a different egress port, and wherein the particular data unit processor is configured to forward the certain data units to a destination on a network.

In an embodiment, repeatedly adjusting the state release threshold comprises adjusting the state release threshold more frequently when the queue is of a higher size.

In an embodiment, the size of the queue is a count of data units enqueued within the queue; wherein the state release point adjustment logic is part of a background update process configured to adjust the state release threshold in a same time slot as updating the count.

Other examples of these and other embodiments are found throughout this disclosure.

6.0. EXAMPLE IMPLEMENTING SYSTEM

According to some embodiments, at least some of the techniques described herein are particularly applicable to the queueing of data units for processing in computing components within a computer network. A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network router may determine one or more other networking devices, among a number of possible other networking devices, to forward the IP data packet to.

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

6.1. Network Packets

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment) to a second node 110 over a path that includes an intermediate node 110. This data unit will be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g. packets or frames) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the node may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the packet, a label to attach the packet, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, or routing cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the terms "data unit" and "packet" as used herein should be understood to refer to any type of data structure communicated across a network, including packets as well as segments, cells, data frames, datagrams, and so forth.

6.2. Network Paths

Any node in the depicted network 100 may communicate with any other node in the network 100 by sending packets through a series of nodes 110 and links, referred to as a path. For example, Node B (110b) may send packets to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g. which egress port it should send the packet out on). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110. In this manner, the actual path of a packet is product of each node 110 along the path making routing decisions about how best to move the packet along to the destination node 110 identified by the packet.

6.3. Network Device

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. Note that, in an embodiment, some or all of the nodes 110 in system 100 may each be a separate network device 200.

In another embodiment, device 200 may be one of a number of components in a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip. The network switch or router may even include multiple devices 200.

6.4. Ports

Network device 200 includes ports 210/290. Ports 210, including ports 210a-n, are inbound ("ingress") ports by which data units 205, such as packets or the constituent cells or frames thereof, are received over a network, such as network 110. Ports 290, including ports 290a-n, are outbound ("egress") ports by which at least some of the data units 205 are sent out to other destinations within the network, after having been processed by the network device 200.

Data units 205 may be packets, cells, frames, or other suitable structures. In many embodiments, the individual atomic data units 205 upon which the depicted components typically operate are cells or frames. That is, data units are received, acted upon, and transmitted at the cell or frame level. These cells or frames are logically linked together as the packets to which they respectively belong for purposes of determining how to handle the cells or frames. However, the cells or frames may not actually be assembled into packets within device 200, particularly if the cells or frames are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or multiple egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 220. On the other end, an egress packet processor 220 may input data units serially into another SerDes block, which outputs the data units in parallel to ports 290.

6.5. Packet Processors

A device 200 comprises one or more packet processing components 220 that collectively implement forwarding logic by which the device 200 is configured to determine how to handle each data unit the device 200 receives. These packet processors 220 may be any suitable combination of fixed circuitry and/or software-based logic, such as specific logic components implemented by one or more Field Programmable Gate Arrays (FPGAs) or Application-Specific Integrated Circuits (ASICs), or a general purpose processor executing software instructions.

Different packet processors 220 may be configured to perform different packet processing tasks. For instance, some packet processors may forward data units 205 out egress ports 290, other packet processors 220 may implement flow control mechanisms, other packet processors 220 may perform statistical collection or debugging tasks, and so forth. A device 200 may comprise any number of packet processors 220 configured to perform any number of processing tasks.

In an embodiment, the packet processors 220 of a device 200 are arranged such that the output of one packet processor 220 is, eventually, input into another processor 220, in such a manner as to pass data units 205 from certain packet processor(s) 220 to other packet processor(s) 220 in a sequence of stages, until finally disposing of the data units 205 (e.g. by sending the out an egress port 290, "dropping" the data units 205, etc.). The exact set and/or sequence of packet processors 220 that process a given data unit 205 may vary, in some embodiments, depending on the attributes of the data unit 205 and/or the state of the device 200.

Ingress and Egress Processors

In an embodiment, a packet processor 220 may be generally classified as an ingress packet processor 220 or an egress packet processor 220. Generally speaking, an ingress packet processor 220 performs certain routine intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units, making initial categorizations of data units, and so forth. In an embodiment, there may be fewer ingress packet processors 220 relative to egress packet processor(s) 220, or even just one ingress packet processor 220.

The egress packet processor(s) 220 of a device 200, by contrast, are configured to perform all non-intake tasks necessary to implement the forwarding logic of the device 200. These tasks may include, for example, tasks such as identifying paths along which to forward the data units, implementing flow control and/or other policies, manipulating data units, performing statistical or debugging operations, and so forth. In an embodiment, there may be different egress packet processors(s) 220 assigned to different flows or other categories of traffic, such that not all data units 205 will be processed by the same egress packet processor 220.

In an embodiment, multiple egress packet processor(s) 220 may be chained together such that a data unit 205 processed by a first egress packet processor 220 is later processed by a second egress packet processor 220 configured to send the data unit 205 out a specific port 290. There is no limit to the number of packet processor(s) 220 within such a chain.

Forwarding Logic and Tables

As mentioned, the packet processors 220 collectively implement the forwarding logic of a device 200. The forwarding logic of a device 200, or portions thereof, may, in some instances, be hard-coded into the packet processors 220. For instance, the device 200 may be configured to always react to certain types of data units in certain circumstances in a certain way. The forwarding logic, or portions thereof, may also be configurable, in that the logic changes over time in response to data collected from or instructions received from other nodes in the network in which the device 200 is located.

For example, a device 200 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For instance, such attributes or characteristics may include a Quality-of-Service level specified by the data unit or associated with another characteristic of the data unit, a flow control group, an ingress port 210 through which the data unit was received, a tag or label in a packet's header, a source address, a destination address, a packet type, or any other suitable distinguishing property.

In an embodiment, forwarding logic may read port state data. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given data unit belongs.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

According to an embodiment, the forwarding logic reads certain instructions for handling network traffic from one or more tables. Generally, the tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, system 200 comprises path management control logic that is configured to adjust the forwarding instructions described by a forwarding table based on a variety of factors. For example, path management control logic may be configured to recognize administrative commands that explicitly instruct the path management control logic to add or remove address groups or adjust existing instructions for a group. Path management control logic may also adjust forwarding instructions in response to events that imply changes to the forwarding instructions, such as the receipt of data units that announce the availability of new paths in a network, the dropping of a certain number of data units to a destination, the application of certain flow control measures, or any other suitable event.

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to one or more actions to be performed with respect to network packets or other data structures associated with an input key (e.g. address) that matches the particular prefix. Thus, when determining how to handle a certain data unit, forwarding logic may determine a group of addresses that a data unit is associated with (e.g. a destination subnet, source subnet, etc.) using a prefix, and perform the one or more actions associated with that group.

6.6. Buffers

Since not all data units 205 received by the device 200 can be processed by the packet processor(s) 220 at the same time, various components of device 200 may temporarily store data units 205 in memory structures referred to as buffers 222 while the data units 205 are waiting to be processed. For example, a certain packet processor 220 may only be capable of processing a certain number of data units 205, or portions of data units 205, in a given clock cycle, meaning that other data units 205, or portions of data units 205, must either be ignored (i.e. dropped) or stored. At any given time, a large number of data units 205 may be stored in the buffers 222 of the device 200, depending on network traffic conditions.

Buffers 222, depicted in FIG. 2 as individual buffers 222a-n, collectively form a buffer memory 230. Each buffer 222 may be a portion of any type of memory, including volatile memory and/or non-volatile memory. In an embodiment, each buffer is a distinct memory bank, or set of memory banks. In yet other embodiments, a buffer may be a region within a memory bank. In an embodiment, each buffer comprises many addressable "slots" or "entries" (e.g. rows, columns, etc.) in which data units 205, or portions thereof, may be stored. The number of buffers 222 may vary depending on the embodiment.

A device 200 may include a variety of buffers or sets of buffers, each utilized for varying purposes and/or components. Generally, a data unit awaiting processing by a component is held in a buffer associated with that component until it is "released" to the component for processing.

A component that utilizes one or more buffers may include a buffer manager configured to manage use of those buffer(s). Among other processing tasks, the buffer manager may, for example, allocate and deallocate specific segments of memory for buffers, create and delete buffers within that memory, identify available buffer entries in which to store a newly received data unit 205, maintain a mapping of buffers entries to data units 205 stored in those buffers entries (e.g. by a packet sequence number assigned to each packet when the first data unit 205 in that packet was received), mark a buffer entry as available when a data unit 205 stored in that buffer 222 is dropped or sent from the device 200, determine when a data unit must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer should be utilized to store a given data unit 205, or portion thereof. In some embodiments, each packet is stored in a single entry within its assigned buffer. In yet other embodiments, a packet is received as, or divided into, constituent data units such as fixed-size cells or frames. The buffers may store these constituent data units separately (e.g. not in the same location, or even the same buffer).

6.7. Queues

In an embodiment, to manage the order in which data units 205 are processed from the buffers, various components of a device 200 may implement queueing logic. Each data unit 205, or the buffer locations(s) in which it is stored, is said to belong to one or more constructs referred to as queues 224. Typically, a queue is a set of memory locations (i.e. in the buffers) arranged in some order by metadata describing the queue. The memory locations may (and often are) non-contiguous relative to their addressing scheme and/or physical arrangement. For example, the metadata for one queue may indicate that the queue is comprised of, in order, entries 1, 50, 3, and 92 in a certain buffer.

The sequence in which the queue arranges its constituent data units 205 generally corresponds to the order in which the data units 205 in the queue will be released and processed. In some embodiments, the number of data units 205 assigned to a given queue at a given time may be limited, either globally or on a per-queue basis, and this limit may change over time.

6.8. Traffic Management

According to an embodiment, a device 200 includes one or more traffic managers 221 configured to control the flow of data units to packet processor(s) 220. For instance, a buffer manager within the traffic manager 221 may temporarily store data units 205 in buffers 222 as they await processing by egress processor(s) 220. Beyond managing the use of buffers 222 to store data units 205 (or copies thereof), the traffic manager 221 may include queueing logic configured to assign buffer entries to queues 224 and manage the flow of data units 205 through the queues 224. The traffic manager 221 may, for instance, identify a specific queue 224 to assign a data unit 205 to upon ingress of the data unit 205. The traffic manager 221 may further determine when to release—also referred to as "dequeuing"—data units 205 (or portions thereof) from queues 224 and provide that data to specific packet processor(s) 220. The traffic manager 221 may further "deallocate" entries in buffer 222 that are no longer being utilized when the data stored within those entries are dequeued from their respective queues. These entries are then reclaimed for use in storing new data through a garbage collection process.

In an embodiment, different queues 224 may exist for different destinations. For example, each port 210 and/or port 290 may have its own set of queues 224. The queue 224 to which an incoming data unit 205 is assigned may therefore be selected based on the port 210 through which it was received. Such a queue may be referred to as an "ingress queue," as it is associated with an ingress port 210. Meanwhile, the queue 224 to which an outgoing data unit is assigned may be selected based on forwarding information indicating which port 290 the data unit should depart from. Such a queue may be referred to as an "egress queue," as it is associated with an egress port 290. In an embodiment, a given egress port 290 may have one or more associated queues.

A different packet processor 220 may be associated with each different set of one or more queues 224. Hence, the current processing context of the data unit 205 may be used to select which queue 224 a data unit 205 should be assigned to.

In an embodiment, there may also or instead be different queues 224 for different flows or sets of flows. That is, each identifiable traffic flow or group of traffic flows is assigned its own set of queues 224 to which its data units 205 are respectively assigned. In an embodiment, different queues 224 may correspond to different classes of traffic or quality-of-service (QoS) levels. Different queues 224 may also or instead exist for any other suitable distinguishing property of the data units 205, such as source address, destination address, packet type, and so forth.

For instance, a data unit may be forwarded to another queue 224 associated with another processing stage implemented by another set of processing components, sent out of the device 200 over an outbound port 290, discarded, delayed for flow control reasons, and so forth. The collective actions of these processing components over these multiple stages is said to implement the forwarding logic of the device 200.

Though only one packet processor 220 and traffic manager 221 are depicted, a device 200 may comprise any number of packet processors 220 and traffic managers 221. For instance, different sets of ports 210 and/or ports 290 may have their own traffic manager 221 and packet processors 220. As another example, in an embodiment, the traffic manager 221 may be duplicated for some or all of the stages of processing a data unit. For example, system 200 may include a traffic manager 221 and egress packet processor 220 for an egress stage performed upon the data unit 205 exiting the system 200, and/or a traffic manager 221 and packet processor 220 for any number of intermediate stages. The data unit 205 may thus pass through any number of traffic managers 221 and/or packet processors 220 prior to exiting the system 200. In other embodiments, only a single traffic manager 221 is needed. If intermediate processing is needed, flow of a data unit 205 may "loop back" to the traffic manager 221 for buffering and/or queuing after each stage of intermediate processing.

An example flow of a data unit 205 through device 200 is as follows. The data unit 205 may be received by a port 210. The data unit 205 is then processed by an ingress packet processor 220, and then delivered to a traffic manager 221. Traffic manager 221 stores the data unit 205 in a buffer 222 and assigns the data unit 205 to a queue 224. Traffic manager 221 manages the flow of the data unit 205 through the queue 224 until the data unit 205 is released to an egress packet processor 220. Depending on the processing, the traffic manager 221 may then assign the data unit 205 to another queue 224 so that it may be processed by yet another processor 220, or the packet processor 220 may send the data unit 205 out another port 290.

In an embodiment, a traffic manager 221 is coupled to the ingress packet processor(s) 220, such that data units 205 (or portions thereof) are assigned to buffers 222 only upon being initially processed by an ingress packet processor 220. Once in an egress buffer 222, a data unit 205 (or portion thereof) may be "released" to one or more egress packet processor(s) 220 for processing, either by the traffic manager 224 sending a link or other suitable addressing information for the corresponding buffer 222 to the egress packet processor 220, or by sending the data unit 205 directly.

In the course of processing a data unit 205, a device 200 may replicate a data unit 205 one or more times. For example, a data unit 205 may be replicated for purposes such as multicasting, mirroring, debugging, and so forth. Thus, a single data unit 205 may be replicated to multiple queues 224. Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 222, or a single copy of the data unit 205 may be linked from a single buffer location 222 to multiple queues 224 at the same time.

6.9. Miscellaneous

Device 200 illustrates only one of many possible arrangements of devices configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100.

7.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 10:
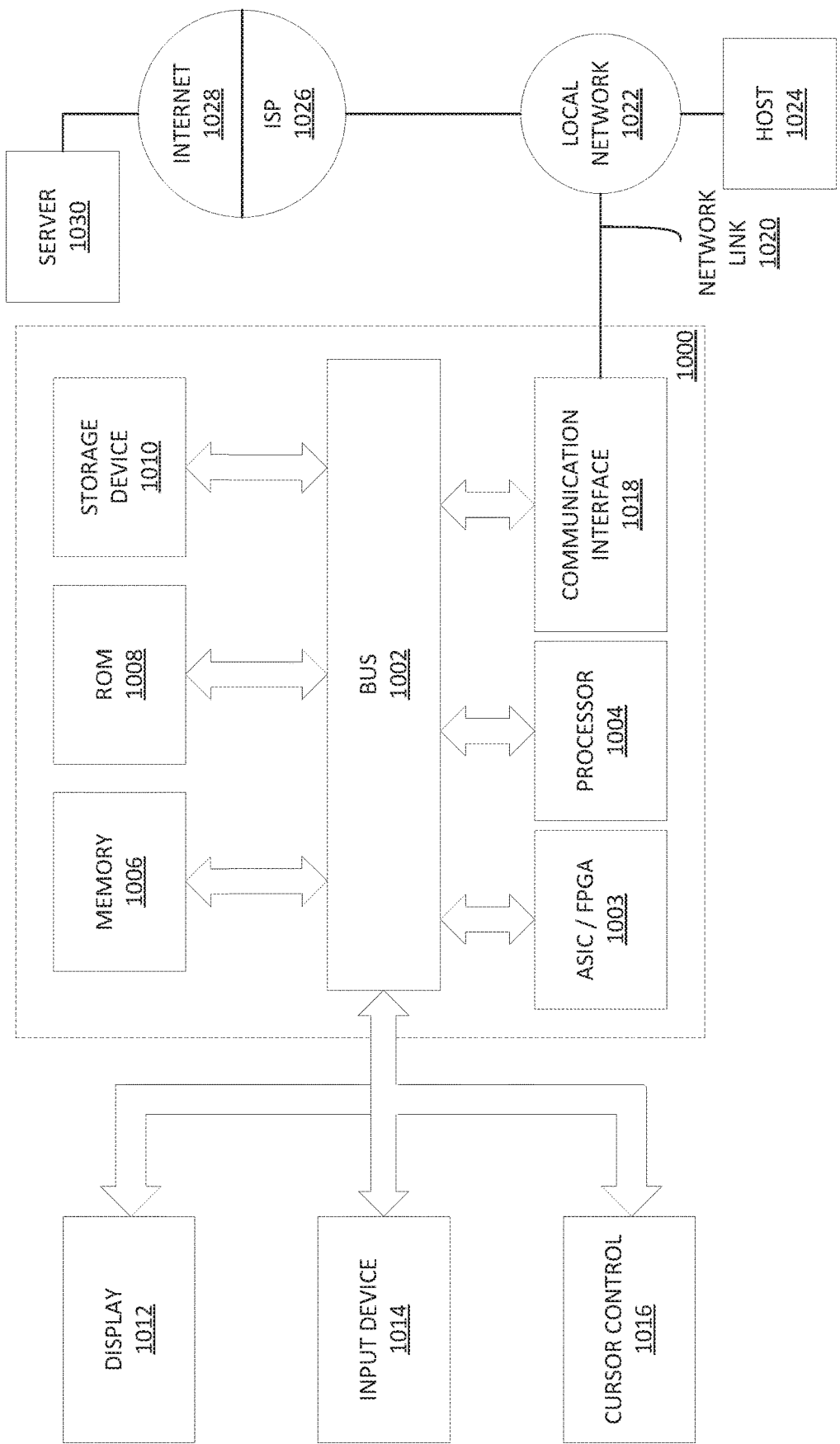
FIG. 10 is block diagram of a computer system upon which embodiments of the inventive subject matter may be implemented.

FIG. 10 is a block diagram that illustrates a computer system 1000 that may be utilized in implementing the above-described techniques, according to an embodiment. Computer system 1000 may be, for example, a desktop computing device, laptop computing device, tablet, smartphone, server appliance, computing mainframe, multimedia device, handheld device, networking apparatus, or any other suitable device. In an embodiment, FIG. 10 and FIG. 2 are both different views of a same networking device. In an embodiment, FIG. 10 and FIG. 3 are both different views of a same computing device.

Computer system 1000 may include one or more ASICs, FPGAs, or other specialized circuitry 1003 for implementing program logic as described herein. For example, circuitry 1003 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1000 may include one or more hardware processors 1004 configured to execute software-based instructions. Computer system 1000 may also include one or more busses 1002 or other communication mechanism for communicating information. Busses 1002 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1000 also includes one or more memories 1006, such as a RAM, hardware registers, or other dynamic or volatile storage device for storing data units to be processed by the one or more ASICs, FPGAs, or other specialized circuitry 1003. Memory 1006 may also or instead be used for storing information and instructions to be executed by processor 1004. Memory 1006 may be directly connected or embedded within circuitry 1003 or a processor 1004. Or, memory 1006 may be coupled to and accessed via bus 1002. Memory 1006 also may be used for storing temporary variables, data units describing rules or policies, or other intermediate information during execution of program logic or instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, may optionally be provided and coupled to bus 1002 for storing information and instructions.

A computer system 1000 may also include, in an embodiment, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as a 1002.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an embodiment, computer system 1000 can send packets and receive data through the network(s), network link 1020, and communication interface 1018. In some embodiments, this data may be data units that the computer system 1000 has been asked to process and, if necessary, redirect to other computer systems via a suitable network link 1020. In other embodiments, this data may be instructions for implementing various processes related to the described techniques. For instance, in the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

Computer system 1000 may optionally be coupled via bus 1002 to one or more displays 1012 for presenting information to a computer user. For instance, computer system 1000 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1012.

One or more input devices 1014 are optionally coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an embodiment, a network-based input device 1014 may be utilized. In such an embodiment, user input and/or other information or commands may be relayed via routers and/or switches on a Local Area Network (LAN) or other suitable shared network, or via a peer-to-peer network, from the input device 1014 to a network link 1020 on the computer system 1000.

As discussed, computer system 1000 may implement techniques described herein using customized hard-wired logic, one or more ASICs or FPGAs 1003, firmware and/or program logic, which in combination with the computer system causes or programs computer system 1000 to be a special-purpose machine. According to one embodiment, however, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1000 can receive the data on the network and demodulate the signal to decode the transmitted instructions. Appropriate circuitry can then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

8.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a plurality of data units over time;
   enqueuing at least certain data units of the data units in a queue;
   dequeuing the certain data units from the queue for processing by a processing component associated with the queue;
   repeatedly updating queue state information during said enqueueing and dequeuing, comprising:
      transitioning to a first state upon determining that the queue is of a size that surpasses a state entry threshold;
      transitioning away from the first state upon determining that the queue is of a size that falls below a state release threshold, the state release threshold being lower than the state entry threshold;
   repeatedly adjusting the state release threshold during said enqueueing and dequeuing, the state release threshold adjusted based on at least one of: randomly selected values, pseudo-randomly selected values, or a pattern of values;
   determining one or more actions to take with respect to particular data units of the data units based on a current state indicated by the queue state information.

2. The method of claim 1, wherein determining the one or more actions comprises, when the queue is in the first state, determining to discard first data units assigned to the queue without enqueueing the first data units in the queue.

3. The method of claim 1, wherein the state release threshold is adjusted within a range of values spanning no more than between the state entry threshold and a reserve threshold.

4. The method of claim 1, wherein repeatedly adjusting the state release threshold is based on the randomly selected values or the pseudo-randomly selected values, the method further comprising:
- determining a difference between a reserve threshold and the state entry threshold;
- determining a bit position of a most significant bit in the difference;
- selecting the randomly selected values or the pseudo-randomly selected values by selecting a number of bits from a linear-feedback shift register, the number of bits determined by the bit position of the most significant bit in the difference.

5. The method of claim 1, wherein the data units are network packets, cells, or frames, wherein the queue is one of a plurality of egress queues of a network device, each associated with a different egress port, and wherein the processing component is configured to forward the certain data units to a destination on a network.

6. The method of claim 1, wherein repeatedly adjusting the state release threshold comprises adjusting the state release threshold more frequently when the queue is of a higher size.

7. The method of claim 1,
- wherein the size of the queue is a count of data units enqueued within the queue;
- wherein repeatedly updating the queue state information comprises updating the queue state information using a background process in a same time slot as the count is updated.

8. A system comprising:
- one or more communication interfaces configured to receive a plurality of data units over time;
- one or more data unit processors configured to process the data units;
- queue admission control logic configured to enqueue at least certain data units of the data units in a queue;
- queue management logic configured to dequeue the certain data units from the queue for processing by a particular data unit processor associated with the queue;
- queue state control logic configured to repeatedly update queue state information during said enqueueing and dequeuing, by at least:
  - transitioning to a first state upon determining that the queue is of a size that surpasses a state entry threshold;
  - transitioning away from the first state upon determining that the queue is of a size that falls below a state release threshold, the state release threshold being lower than the state entry threshold;
- state release point adjustment logic configured to repeatedly adjust the state release threshold during said enqueueing and dequeuing, the state release threshold adjusted based on at least one of: randomly selected values, pseudo-randomly selected values, or a pattern of values;
- wherein at least one of the queue admission control logic or the particular data unit processor is configured to determine one or more actions to take with respect to particular data units of the data units based on a current state indicated by the queue state information.

9. The system of claim 8, wherein the queue admission control logic is further configured to determine the one or more actions by, when the queue is in the first state, determining to discard first data units assigned to the queue without enqueueing the first data units in the queue.

10. The system of claim 8, wherein the state release threshold is adjusted within a range of values spanning no more than a difference between the state entry threshold and a reserve threshold.

11. The system of claim 8, wherein the state release point adjustment logic is further configured to adjust the state release threshold based on the randomly selected values or the pseudo-randomly selected values, by:
- determining a difference between a reserve threshold and the state entry threshold;
- determining a bit position of a most significant bit in the difference;
- selecting the randomly selected values or the pseudo-randomly selected values by selecting a number of bits from a linear-feedback shift register, the number of bits determined by the bit position of the most significant bit in the difference.

12. The system of claim 8, wherein the data units are network packets, cells, or frames, wherein the queue is one of a plurality of egress queues of a network device, each associated with a different egress port, and wherein the particular data unit processor is configured to forward the certain data units to a destination on a network.

13. The system of claim 8, wherein repeatedly adjusting the state release threshold comprises adjusting the state release threshold more frequently when the queue is of a higher size.

14. The system of claim 8,
- wherein the size of the queue is a count of data units enqueued within the queue;
- wherein the state release point adjustment logic is part of a background update process configured to adjust the state release threshold in a same time slot as updating the count.

15. One or more non-transitory computer-readable media storing instructions that, when executed by one or more computing devices, cause performance of:
- receiving a plurality of data units over time;
- enqueuing at least certain data units of the data units in a queue;
- dequeuing the certain data units from the queue for processing by a processing component associated with the queue;
- repeatedly updating queue state information during said enqueueing and dequeuing, comprising:
  - transitioning to a first state upon determining that the queue is of a size that surpasses a state entry threshold;
  - transitioning away from the first state upon determining that the queue is of a size that falls below a state release threshold, the state release threshold being lower than the state entry threshold;
- repeatedly adjusting the state release threshold during said enqueueing and dequeuing, the state release threshold adjusted based on at least one of: randomly selected values, pseudo-randomly selected values, or a pattern of values;
- determining one or more actions to take with respect to particular data units of the data units based on a current state indicated by the queue state information.

16. The one or more non-transitory computer-readable media of claim 15, wherein determining the one or more actions comprises, when the queue is in the first state, determining to discard first data units assigned to the queue without enqueueing the first data units in the queue.

17. The one or more non-transitory computer-readable media of claim 15, wherein repeatedly adjusting the state release threshold is based on the randomly selected values or the pseudo-randomly selected values.

18. The one or more non-transitory computer-readable media of claim 15, wherein the data units are network packets, cells, or frames, wherein the queue is one of a plurality of egress queues of a network device, each associated with a different egress port, and wherein the processing component is configured to forward the certain data units to a destination on a network.

19. The one or more non-transitory computer-readable media of claim 15, wherein repeatedly adjusting the state release threshold comprises adjusting the state release threshold more frequently when the queue is of a higher size.

20. The one or more non-transitory computer-readable media of claim 15,
   wherein the size of the queue is a count of data units enqueued within the queue;
   wherein repeatedly updating the queue state information comprises updating the queue state information using a background process in a same time slot as the count is updated.

21. The method of claim 1, wherein repeatedly adjusting the state release threshold is based on the randomly selected values or the pseudo-randomly selected values.

22. The system of claim 8, wherein repeatedly adjusting the state release threshold is based on the randomly selected values or the pseudo-randomly selected values.

\* \* \* \* \*

UNITED STATES PATENT AND TRADEMARK OFFICE
CERTIFICATE OF CORRECTION

PATENT NO.         : 10,587,536 B1
APPLICATION NO.    : 15/996378
DATED              : March 10, 2020
INVENTOR(S)        : Kwan et al.

Page 1 of 1

It is certified that error appears in the above-identified patent and that said Letters Patent is hereby corrected as shown below:

In the Claims

Column 34
Claim 10: Line 3: Delete "a difference"

Signed and Sealed this
Seventh Day of April, 2020

Andrei Iancu
*Director of the United States Patent and Trademark Office*